(12) United States Patent  (10) Patent No.: US 8,808,537 B1
Livingston  (45) Date of Patent: Aug. 19, 2014

(54) SELF-CONTAINED TRANSPORTABLE WATER TREATMENT SYSTEM

(76) Inventor: Eddie Carl Livingston, Alamogordo, NM (US)

( * ) Notice: Subject to any disclaimer, the term of this patent is extended or adjusted under 35 U.S.C. 154(b) by 591 days.

(21) Appl. No.: 13/167,604

(22) Filed: Jun. 23, 2011

Related U.S. Application Data (60) Provisional application No. 61/357,831, filed on Jun. 23, 2010.

(51) Int. Cl.
*B01D 33/00* (2006.01)

(52) U.S. Cl.
USPC ...... 210/196; 210/241; 210/260; 210/333.01; 210/411

(58) Field of Classification Search
USPC .............. 210/196, 241, 260, 333.01, 411
See application file for complete search history.

(56) References Cited

U.S. PATENT DOCUMENTS

| | | | |
|---|---|---|---|
| 3,339,743 A | 9/1967 | Bealle | |
| 4,206,052 A | 6/1980 | Mandt | |
| 4,366,063 A * | 12/1982 | O'Connor | 210/652 |
| 4,836,921 A | 6/1989 | Hahn et al. | |
| 4,897,099 A | 1/1990 | Ruff | |
| 5,268,093 A | 12/1993 | Hembree et al. | |
| D350,807 S | 9/1994 | Michels | |
| D410,726 S | 6/1999 | Cook | |
| 6,402,949 B1 | 6/2002 | Banks | |
| 6,863,827 B2 * | 3/2005 | Saraceno | 210/748.11 |
| D559,943 S | 1/2008 | Mercer | |
| D575,843 S | 8/2008 | Werner | |
| 7,632,410 B2 | 12/2009 | Heiss | |
| 7,775,374 B1 | 8/2010 | Barker et al. | |
| 2008/0314807 A1 * | 12/2008 | Junghanns et al. | 210/85 |
| 2010/0224558 A1 | 9/2010 | Barker | |
| 2010/0307973 A1 * | 12/2010 | Grcevic | 210/639 |
| 2013/0313191 A1 * | 11/2013 | Wolf et al. | 210/638 |

OTHER PUBLICATIONS

"Mobile MaxPure: Solar-powered water-purifier on wheels", http://greendiary.com/entry/mobile-maxpure-solar-powered-water-purifier-on-wheels/ GreenDiary , 1-7.
"Water & Power Solutions from the Sun", http://www.worldwatersolar.com Worldwater & Solar Technologies, Incorporated , 1.

* cited by examiner

*Primary Examiner* — Chester Barry
(74) *Attorney, Agent, or Firm* — Lewis Roca Rothgerber LLP; Samantha A. Updegraff (57) ABSTRACT

A portable self-contained water treatment system. A raw water tank is provided which can be filled by a pump or by manually pouring dirty water into it. The raw water tank can also act as a chemical pre-treatment tank such that one or more pre-treatment chemicals can be added to the water contained therein.

11 Claims, 9 Drawing Sheets

Fig. 1

| NO. | COMPONENT DESCRIPTION | FILT | BW1 | BW2 | BW3 | BW4 | DRNK |
|---|---|---|---|---|---|---|---|
| 12 | RAW WATER INLET TANK | ---- | ---- | ---- | ---- | ---- | ---- |
| 50 | RAW WATER HIGH LEVEL SWITCH | X | N/A | N/A | N/A | N/A | N/A |
| 52 | RAW WATER LOW LEVEL SWITCH | X | N/A | N/A | N/A | N/A | N/A |
| 32 | TREATED WATER TANK | ---- | ---- | ---- | ---- | ---- | ---- |
| 54 | TREATED WATER HIGH LEVEL SWITCH | O | X/O | X/O | X/O | X/O | X/O |
| 56 | TREATED WATER LOW LEVEL SWITCH | X/O | X | X | X | X | X |
| 20 | RAW WATER PUMP | ON | OFF | OFF | OFF | OFF | OFF |
| 34 | TREATED WATER PUMP | OFF | ON | OFF | OFF | ON | ON |
| 24 | ULTRAFILTRATION UNIT | ---- | ---- | ---- | ---- | ---- | ---- |
| 22 | FEED WATER INLET VALVE | O | X | X | X | X | X |
| 28 | PERMEATE OUTLET VALVE | O | X | X | X | X | X |
| 62 | TREATED WATER BACKWASH VALVE | X | O | X | X | O | X |
| 64 | BACKWASH WASTE VALVE | X | O | O | O | O | X |
| 66 | DRAIN VALVE | X | X | X | O | X | X |
| 38 | DISTRIBUTION VALVE | X | X | X | X | X | O |
| 74 | AIR COMPRESSOR | OFF | OFF | ON | OFF | OFF | OFF |
| 30 | DISINFECTION SYSTEM | ON | OFF | OFF | OFF | OFF | OFF |
| 14 | RAW WATER INLET SCREEN | ---- | ---- | ---- | ---- | ---- | ---- |
| 18 | FLUSHABLE MESH SCREEN | ---- | ---- | ---- | ---- | ---- | ---- |
| 36 | TREATED WATER PRESSURE TANK | ---- | ---- | ---- | ---- | ---- | ---- |
| 40 | CARTRIDGE FILTER NO. 1 | ---- | ---- | ---- | ---- | ---- | ---- |
| 42 | CARTRIDGE FILTER NO. 2 | ---- | ---- | ---- | ---- | ---- | ---- |
| 44 | CARTRIDGE FILTER NO. 3 | ---- | ---- | ---- | ---- | ---- | ---- |
| 46 | DRINKING WATER OUTLET | X | X | X | X | X | X/O |
| 76 | PERMEATE AIR RELEASE VALVE | ---- | ---- | ---- | ---- | ---- | ---- |
| 78 | BACKWASH AIR RELEASE VALVE | ---- | ---- | ---- | ---- | ---- | ---- |
| 58 | TANK LEVEL GAGE FOR TANK 12 | ---- | ---- | ---- | ---- | ---- | ---- |
| 60 | TANK LEVEL GAGE FOR TANK 32 | ---- | ---- | ---- | ---- | ---- | ---- |
| 80 | BLOW-DOWN VALVE FOR 16 | ---- | ---- | ---- | ---- | ---- | ---- |
| 62 | BACK WASH VALVE | | | | | | |
| 82 | BLOW-DOWN VALVE FOR 18 | ---- | ---- | ---- | ---- | ---- | ---- |
| 37 | SCREEN-FLUSH VALVE FOR SC2 | ---- | ---- | ---- | ---- | ---- | ---- |
| 16 | RAW WATER TANK UNDERDRAIN | ---- | ---- | ---- | ---- | ---- | ---- |
| 94 | RAW WATER TANK MIXING VALVE | ---- | ---- | ---- | ---- | ---- | ---- |
| 96 | RAW WATER TANK MIXING INLET | ---- | ---- | ---- | ---- | ---- | ---- |
| 70 | TREATED WATER RECIRCULATING VALVE – LOOP 1 | ---- | ---- | ---- | ---- | ---- | ---- |
| 72 | TREATED WATER RECIRCULATING VALVE – LOOP 2 | ---- | ---- | ---- | ---- | ---- | ---- |
| 93 | CLEAN-IN-PLACE VALVE | ---- | ---- | ---- | ---- | ---- | ---- |
| 91 | CLEANING CARTRIDGE | ---- | ---- | ---- | ---- | ---- | ---- |
| | CLEANING CARTRIDGE ISOLATION VALVE 1 | ---- | ---- | ---- | ---- | ---- | ---- |
| | CLEANING CARTRIDGE ISOLATION VALVE 2 | ---- | ---- | ---- | ---- | ---- | ---- |

VALVE STATE:
O = OPEN, X = CLOSED, BWs = BACKWASHs,
FLT = FILTRATION, DRNK = DRINKING

SELF-CONTAINED TRANSPORTABLE WATER TREATMENT SYSTEM

CROSS REFERENCE TO RELATED APPLICATIONS

This application claims priority to and the benefit of the filing of U.S. Provisional Patent Application Ser. No. 61/357,831, entitled "Self-Contained Transportable Solar Powered Drinking Water Treatment Apparatus and Method of Use", filed on Jun. 23, 2010 and the specification thereof is incorporated herein by reference.

BACKGROUND OF THE INVENTION

1. Field of the Invention (Technical Field)

Embodiments of the present invention relate to water treatment and more particularly to a solar powered drinking water treatment apparatus and method of use.

2. Background

Natural disasters, such as hurricanes, floods and earthquakes, can damage water supplies and leave populations without water that is safe to consume. Humanitarian relief agencies are often tasked with the responsibility of securing a water source for the affected population in a minimum time frame. The available water sources are often bodies of water that have been polluted by the disaster, such as ponds, streams, lakes, rivers and shallow wells. Treatment of these dirty water sources into drinking water quality can be very difficult because the levels of pollutants and contaminates present are typically highly variable and usually are largely unknown to the responder until actually encountered at the site. Existing water treatment systems rely on grid power or use engine-driven generators to provide power for pumps and equipment. Such systems are typically not easily transported, and the logistics of obtaining fuel at remote or disaster-damaged locations is problematic for the relief agency. Known solar-powered water purifying systems include U.S. Pat. No. 7,775,374 B1 to Barker, et al., which describes a self-powered water purification system. That system, however, requires the use of a pump suction hose for drawing water out of a contaminated water source, and cannot provide raw water chemical addition, recirculation and mixing because it does not have a raw water storage tank or chemical addition, or raw water recirculation and mixing apparatus. That system also requires the use of a fine filter for treatment of a contaminated water source, and cannot provide membrane cleaning or back washing because it does not have a treated water storage tank or cleaning chemical addition, or treated water back wash and treated water pumping apparatus, or membrane pulsing device. That system also requires the use of the raw water pump for transferring water through the filter system and out a faucet, and cannot provide treated water recirculation through disinfection or other filters because it does not have a treated water storage tank or chemical addition, or treated water recirculation and pumping apparatus. That system also requires the use of 2 micron fine filter for treatment of a contaminated water source, and cannot provide ultra-filtration because it does not have a ultra-filtration membrane filter. U.S. Pat. No. 6,863,827, to Saraceno, which describes a solar powered portable water purifier. That system, however, requires the use of a pump suction hose for drawing water out of a contaminated water source, and cannot do raw water chemical addition, recirculation and mixing because it does not have a raw water storage tank or chemical addition, or raw water recirculation and mixing apparatus. That system also requires the use of a fine filter for treatment of a contaminated water source, and cannot provide membrane cleaning or back washing because it does not have a treated water storage tank or cleaning chemical addition, or treated water back wash and treated water pumping apparatus, or membrane pulsing device. That system also requires the use of the raw water pump for transferring water through the filter system and out a faucet, and cannot provide treated water recirculation through disinfection or other filters because it does not have a treated water storage tank or chemical addition, or treated water recirculation and pumping apparatus. That system also requires the use of 1 micron and 0.35 micron filters for treatment of a contaminated water source, and cannot provide ultra-filtration because it does not a finer mesh ultra-filtration membrane filter. A self-contained, solar powered, water purification system known as the MOBILE MAX PURE™ is sold by WorldWater & Power at www.worldwater.com. That system, however, requires the use of a pump suction hose for drawing water out of a contaminated water source, and cannot provide raw water chemical addition, recirculation and mixing because it does not have a raw water storage tank or chemical addition, or raw water recirculation and mixing apparatus. That system also requires the use of a fine filter for treatment of a contaminated water source, and cannot provide membrane cleaning or back washing because it does not have a treated water storage tank or cleaning chemical addition, or treated water back wash and treated water pumping apparatus, or membrane pulsing device. That system also requires the use of the raw water pump for transferring water through the filter system and out of a faucet, and cannot provide treated water recirculation through disinfection or other filters because it does not have a treated water storage tank or chemical addition, or treated water recirculation and pumping apparatus. That system also requires the use of 20 micron and 5 micron filters for treatment of a contaminated water source, and cannot provide ultra-filtration because it does not a finer mesh ultra-filtration membrane filter. U.S. Pat. Application Publication No. US 2010/0224558, to Barker, teaches a water filtration system. That system, however, requires the use of a raw water line for drawing water out of a water source, and cannot provide raw water chemical addition, recirculation and mixing because it does not have a raw water storage tank or chemical addition, or raw water recirculation and mixing apparatus. That system also requires the use of a fine filter for treatment of a contaminated water source, and cannot provide membrane cleaning or back washing because it does not have a treated water storage tank or cleaning chemical addition, or treated water back wash and treated water pumping apparatus, or membrane pulsing device. That system also requires the use of the treated water line for transferring water through the filter system and out, and cannot provide treated water recirculation through disinfection or other filters because it does not have a treated water storage tank or chemical addition, or treated water recirculation and pumping apparatus. That system also requires the continuous processing of treated water while back washing a selected filter unit or filter units. Generally, drawbacks of these known units are that they do not utilize raw water storage and optional pre-treatment of the feed water by screening, chemical addition, mixing and particle settling prior to the main filtration step, which places a practical limit on how "dirty" the water to be treated can be, and/or increases the frequency for filter replacement, and/or reduces the volume of water treated, and/or increases maintenance requirements on components. Additionally, further drawbacks of these known units are that they rely on a suction pump to draw raw untreated water into the unit, and rely on the same pump to provide pressure to the filters for treatment, which requires additional electrical power and/or is inefficient. Another drawback of these known units are that they do not utilize membrane filters with small openings sufficient to restrict passage of turbidity, bacteria and other disease causing micro-organisms, which subjects the filtered water to the presence of these organisms and turbidity, and/or limits the effectiveness of the disinfection of filtered water. Further drawbacks of these units are that they do not utilize treated water storage, which limits post-treatment of the filtered water by chemical addition, recirculation through disinfection or alternative media, and/or does not provide clean water for back washing of the filter. Some other drawbacks of these units are that they do not utilize a dedicated treated water pump, which eliminates the self-contained aspect for back washing the filter, and/or eliminates operation in "batch mode". Additional drawbacks are that they do not utilize optional chemical cleaning of the main filter or optional pressure-surging during backwashing of the main filter, which increases the frequency for filter replacement and/or increases biological fouling of the filter. Still further, they are not easily transportable by helicopter, fork-lift or by sliding on skids into a truck bed, which limits portability and/or response time. Some other drawbacks are that they do not utilize variable angle solar-power panels, which reduces energy production and efficiency.

There is thus a present need for an apparatus, method, and system, which overcome these problems by providing a self-contained, transportable water treatment system which can purify dirty, contaminated water (obtained from a variety of sources, which may be composed of highly variable water quality in terms of turbidity, sediment, solids and other physical and chemical contaminates in fresh water), into safe, potable drinking water for small populations. Most preferably, one which can be powered by sources which are available after a disaster, including but not limited to solar-power and/or human-power. There is further a need for an apparatus, method, and system, which includes a raw water tank which can be manually filled to reduce pumping energy requirements, and which also provides a robust pre-treatment process utilizing: removable and cleanable coarse screening, water treatment chemical addition, mixing, flocculation, floatation and/or sedimentation; a filtration process capable of removing sub-micron particles and organisms; a disinfection process for destruction and/or inactivation of harmful organisms; and a post-treatment process capable of further removal of chemical and biological contaminates. There is further a need for an apparatus, method, and system, which will provide water treatment to comply to requirements of the US EPA Long Term 2 Surface Water Treatment Rule in producing potable water for human consumption. There is also a need for a method, system, and apparatus which can include treated water storage for optional disinfection by chlorine or other chemical additions; treated water recirculation through disinfection and/or various media filters; a cabinet with handles and/or skids incorporated therein for sliding the apparatus horizontally into a truck bed, and which can include lift-eyes and lift-strap spaces for movement by helicopter and foot-pads for movement by fork lift; and/or a solar-power panel that is hinged and may be locked to variable solar angles for optimum energy production.

BRIEF SUMMARY OF THE INVENTION

An embodiment of the present invention relates to a water-treatment system having a raw water tank, an ultra-filtration unit; a treated water tank; said raw-water tank, said ultra-filtration unit, and said treated water tank; secured within a transportable frame; and a control unit. The transportable frame can include a wheeled frame having a size which is movable by a single person tilting it onto its wheels and pushing it under human power. The raw water tank can be fillable through an opening at an upper portion thereof. The raw water tank can include a mechanism for providing turbulence during pre-treatment of water contained therein, which can optionally include a re-circulation loop that can be powered by a pump. The recirculation loop can include one or more nozzles through which raw water and at least one pre-treatment chemical are injected into the raw water tank. Optionally, at least one of the nozzles can rotate.

In one embodiment, the system can include a disinfection unit, which can optionally include an ultraviolet light source. The system can also include a treated water tank; a treated water recirculation loop; and/or a backwash system. The backwash system can include a backwash filter, which can hold a cleaning chemical that is backwashed into the ultrafiltration unit. Optionally, the control unit can include an electronic control system, which itself can optionally include plurality of electrically-activated valves and/or a solar-panel.

An embodiment of the present invention relates to a water-treatment system having a pre-treatment raw-water tank, an ultra-filtration unit, and an ultra-filtration unit backwashing system. The backwashing system can include a backwash filter that releases a cleaning chemical during backwashing; and/or a backwashing pump. The backwashing pump can also power a recirculation loop of a treated water tank. Optionally, the backwashing pump can be a dedicated backwashing pump. The water treatment system can include a plurality of cartridge filters. The backwashing system can provide a pulsating flow of backwash fluid and/or an air-scouring operation.

An embodiment of the present invention relates to a water treatment system having a raw water tank, an ultrafiltration unit, a treated water tank, and a recirculation loop. The recirculation loop can circulate the contents of the raw water tank and/or it can mix pre-treatment chemicals into raw water contained in the raw water tank. Optionally, the recirculation loop can circulate contents of the treated water tank. In embodiments wherein the recirculation loop does circulate the contents of the treated water tank, it can optionally circulate the contents of the treated water tank through a disinfection unit.

In one embodiment, the water treatment system can include a second recirculation loop, wherein one of the recirculation loops circulates the contents of the raw water tank and the other recirculation loop can circulate the contents of the treated water tank.

Optionally, the water treatment system can include a frame and wheels. The frame can secure all of the wheels, raw water tank, ultrafiltration unit, treated water tank, and recirculation loop into a single unit which is movable by human power of a single individual. Optionally, the frame can include handles and/or skids. The handles can form the skids.

In an embodiment of the present invention, a water treatment apparatus preferably comprises the following:
1. Integral Raw Water Tank—this tank is preferably for manual or pumped filling. It supports a removable debris screen and allows settling of sand. It can also be used for the mixing of treatment chemicals; reaction; flocculation; sedimentation; clarification; under-drain system; sludge storage volume; blow-down; serves as feed pump intake tank; raw water storage; used in batch operation.
2. Integral Treated Water Tank; batch operation; stores Ultrafiltration (UF) backwash water; may be used for disinfection with chlorine; provides disinfection contact time; disinfection after a ultraviolet (UV); stores treated drinking water; serves as the source for a distribution pump.
3. One embodiment of the present invention comprises a primary inlet debris screen that is preferably removable and cleanable for capturing larger particles. The screen can optionally include a secondary mesh screen with smaller screen opening for feed pump protection.
4. An ultra filtration unit is preferably used as a primary filter, which can be used in conjunction with ultraviolet light (UV) disinfection. There are preferably a plurality of, and more preferably at least three post-filtration/disinfection cartridge filters that allow various treatment media to be used for specific water conditioning needs.
5. There is preferably a faucet disposed on the water treatment apparatus to fill bottles or small water containers. The bottles to be filled are preferably placed on a bottle platform that can be removable and stowable.
6. A pressure tank preferably provides pressure for backwashing membranes and distribution to a faucet.
7. A raw water pump preferably provides pressure for filtration. A distribution pump preferably provides membrane backwash pressure and pressure to cartridge filters and faucet.
8. A membrane compartment that accepts multiple style membranes, a separate pump compartment, a separate storage compartment, a separate filter compartment, a separate membrane compartment.
9. A removable, storable, bottle water container rack, platform, perforated drainable, lockable secured in-place.
10. One or more raw/fin tanks for chemical reaction, disinfection, settling, pre-treatment, storage for Chemically Enhanced Backwash (CEB) and (clean-in-place) CIP solutions.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings:

FIG. 2 is a process logic chart which illustrates system logic according to an embodiment of the present invention;

DETAILED DESCRIPTION OF THE INVENTION

Embodiments of the present invention relate to a self-contained, transportable, solar-powered drinking water treatment apparatus and method of use. The water treatment apparatus in one embodiment of the present invention is used for treating dirty water, including but not limited to dirty water encountered after disasters, such as hurricanes, floods, earthquakes and the like. The dirty water is cleaned to a potable water quality. Although numerous forms of power can be used for powering components of the treatment apparatus, including but not limited to grid power, a generator, a battery, a gas motor, human-power, combinations thereof and the like, solar power is preferably used, at least partially. The apparatus preferably comprises a plurality of tanks, screens, filters and disinfection equipment that can be used to treat the dirty water and create potable water quality. The apparatus is preferably compact and easily transported by a small pick-up truck, cart, and/or can also be lifted and transported by helicopter.

Other components can include, but are not limited to, one or more automated valves to control treatment process, an air compressor for cleaning a membrane, tank level float gages to observe tank water levels, storage compartments, air release valves, hatches and doors that are preferably latchable and lockable, an optional two speed feed pump with automatic press start/stop, a variable speed distribution pump with auto press start/stop, interchangeable cartridge filters, removable bottle platform that preferably accommodates various bottle sizes, a sun and/or rain guard around a user interface, perforated bottom plate for maximum drainage, and a hose connector for waste water discharge.

An embodiment of the present invention preferably comprises a water treatment apparatus that operates in a batch operation. The automatic valves preferably only require power when changing positions, such that they conserve power by not utilizing any power when in the open or the closed position. The bucket filling method conserves solar energy for treatment process by not requiring a filling pump to consume energy to fill the unit. The apparatus is preferably clean-in-place (CIP) capable and the feed tank is preferably perforated to assist in blow-down, tank cleaning and draining.

Figure 1:
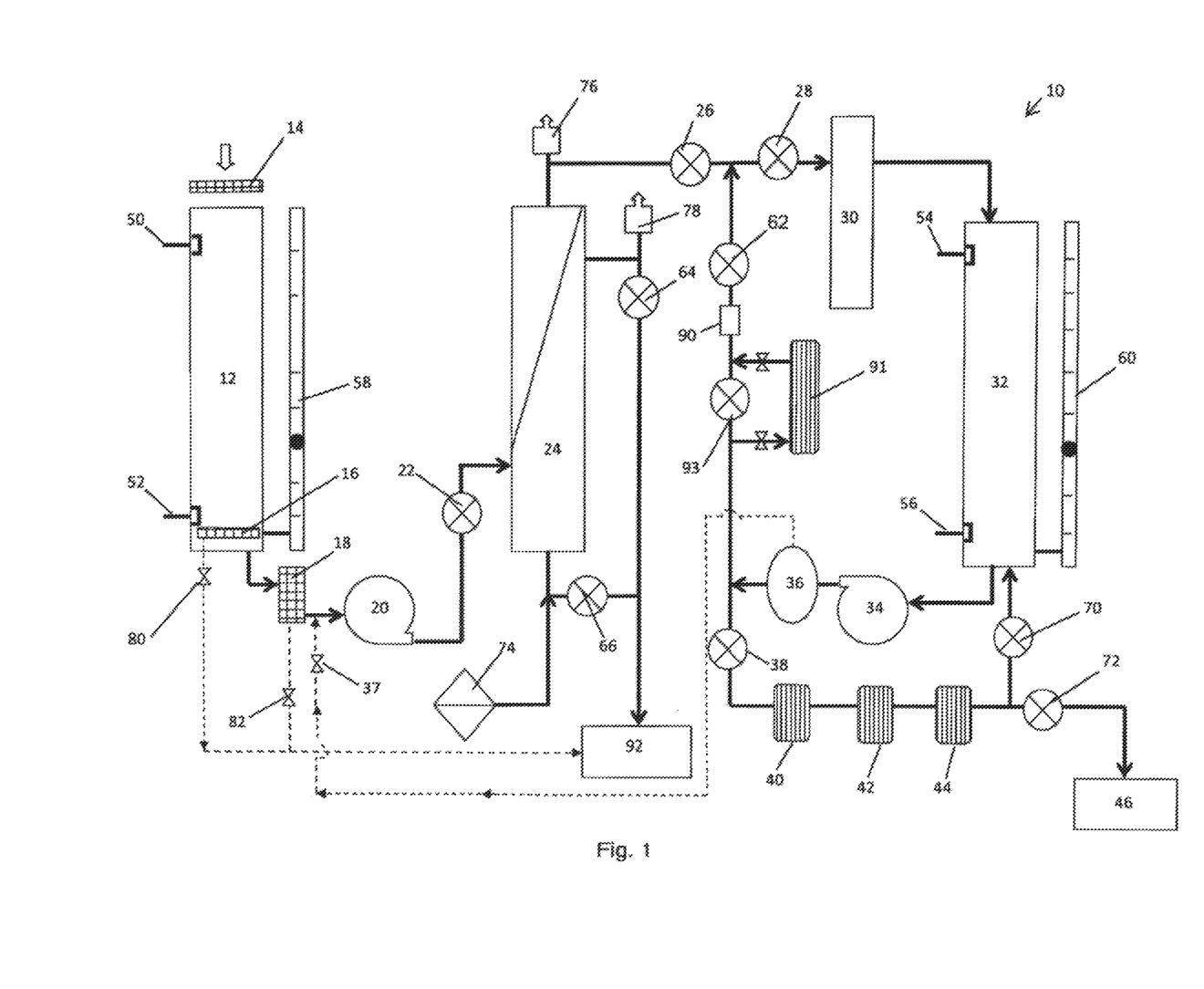
FIG. 1 is a is a diagram which illustrates a treatment system according to an embodiment of the present invention.

FIG. 1 illustrates a flow diagram of an embodiment of water treatment unit 10 according to the present invention. As illustrated therein, dirty water is preferably poured and/or pumped into raw water tank 12, through screen 14, which can be a removable coarse screen. In tank 12, flocculants disinfectants, and/or other chemicals can be mixed into the dirty water. In a purifying operation, water from tank 12 preferably passes out through under-drain 16, before passing through pump screen 18, after which the water passes through pump 20. Pump 20 preferably pushes the water through open valve 22 and up through ultra-filtration unit 24. Ultra-filtration unit 24 can comprise any apparatus, system, and/or process for providing ultra-filtration to the water, including but not limited carbon-activated filter, ultra-fine filter media—including mesh filters, osmotic membranes, combinations thereof, and the like. In one embodiment, unit 24 can comprise any manner of treating non-potable water, such that it is potable, including but not limited to a distillation unit, a chemical treatment unit, combinations thereof and the like. Ultra-filtration unit 24 is preferably a low-pressure membrane consisting of sub-micron size pore openings generally in the range of from 0.01 micron to 0.03 micron for removal of turbidity and organisms of bacteria, virus and the like. In one embodiment, ultra-filtration unit 24 can include a low-pressure membrane having sub-micron-size pore openings and/or can optionally comprise a filter which is capable of filtering out particles, turbidity, organisms of bacteria, virus and the like particles which are less than about 1 micron, and more preferably are less than about 0.1 micron and are most preferably from about 0.01 micron to 0.03 microns. After passing through ultra-filtration unit 24, the water, is then preferably passed through valves 26 and 28, before passing through disinfection unit 30. While numerous manners, systems, and apparatuses capable of disinfecting water, at least partially, will provide desirable results and can be used, disinfection unit 30 preferably comprises an ultraviolet and/or ozone-based disinfection system. After passing through disinfection unit 30, the water preferably enters treated water storage tank 32. When water is desired, pump 34 is preferably activated, thus causing the water to pass through pressure tank 36, valve 38, and one or more cartridge filters 40, 42, and/or 44 before being dispensed through outlet 46. Optionally one or more of filter cartridges 40, 42, and/or 44 can comprise activated carbon, ion-exchange media, manganese green sand, calcite, silicon dioxide, combinations thereof, and the like. Optionally, water from treated water storage tank 32 can be dispensed directly therefrom. In one embodiment, the water from treated water storage tank 32 can flow under hydrostatic pressure through one or more cartridge filters 40, 42, and/or 44, in lieu of providing pump 34. Optionally, backwashing of screen 18 can be accomplished by opening valves 37 and 82, thus allowing a flow of pressurized water from pressure tank 36 to backwash through screen 18 and down to outlet 92.

In one embodiment, high and low water level sensors 50 and 52 are preferably provided on raw water tank 12. High and low water level sensors 54 and 56 are also preferably provided on clean water storage tank 32. Optionally, in addition to the high and low water level sensors, or in lieu thereof, water level gauges 58 and 60 are preferably provided for tanks 12 and 32 respectively. Additionally, valves 62, 64, 36, and/or 93 can also optionally be provided to assist in controlling the flow of water during various processing and/or back-flushing operations. In one embodiment, valves 70 and 72 can be provided such that a recirculation loop can be created wherein water is re-circulated from tank 32, through one or more filters 40, 42, and 44, and back into tank 32. In addition, or in lieu thereof, a recirculation loop can also be provided by opening valves 62 and 28, closing valves 26 and 38 such that when pump 34 is activated, water is recirculate from tank 32 through disinfection unit 30 and back into tank 32. Each of these recirculation loops can optionally be automatically activated by microcontroller 130 (see FIG. 9), after water has remained in tank 32 for a predetermined time. Accordingly, these recirculation loops can keep the water in tank 32 clean, potable, and tasting fresh.

For embodiments of the present invention wherein back-washing through ultra-filtration unit 24 are desired, one or more back-flushing operations can be performed as illustrated in the control logic chart of FIG. 2. Optionally back-washing filter 91 can be activated and/or bypassed by activation and/or deactivation of backwash filter valve 93 and/or by opening and/or closing one or more valves which lead to and from it. Optionally, backwashing filter 91 can be pre-loaded with a cleaning chemical, including but not limited to chlorinating chemicals, citric acid, and/or caustic soda. In this embodiment, during backwashing of ultrafiltration unit 24, filter 91 can release its cleaning agents such that a more thorough cleaning of ultrafiltration unit 24 is accomplished. Optionally backwashing filter 91 can comprise a chemical adding-unit which does not really filter the water flowing there through, but rather merely causes one or more chemicals to be added to the water flowing there through.

In one embodiment, backwash pulsation unit 90 can optionally be provided. In this embodiment, pulsation unit 90 can comprise an active piston or can comprise a simple flutter-valve configuration such that a pulsating effect is added to the flow of water passing through it when pump 34 is activated, and valves 62 and 28 are open. The pulsating effect created by unit 90 preferably helps to dislodge and clean ultra-filtration unit 24 during back-flushing operations. In one embodiment, a dedicated backwashing pump can be provided.

Figure 3:
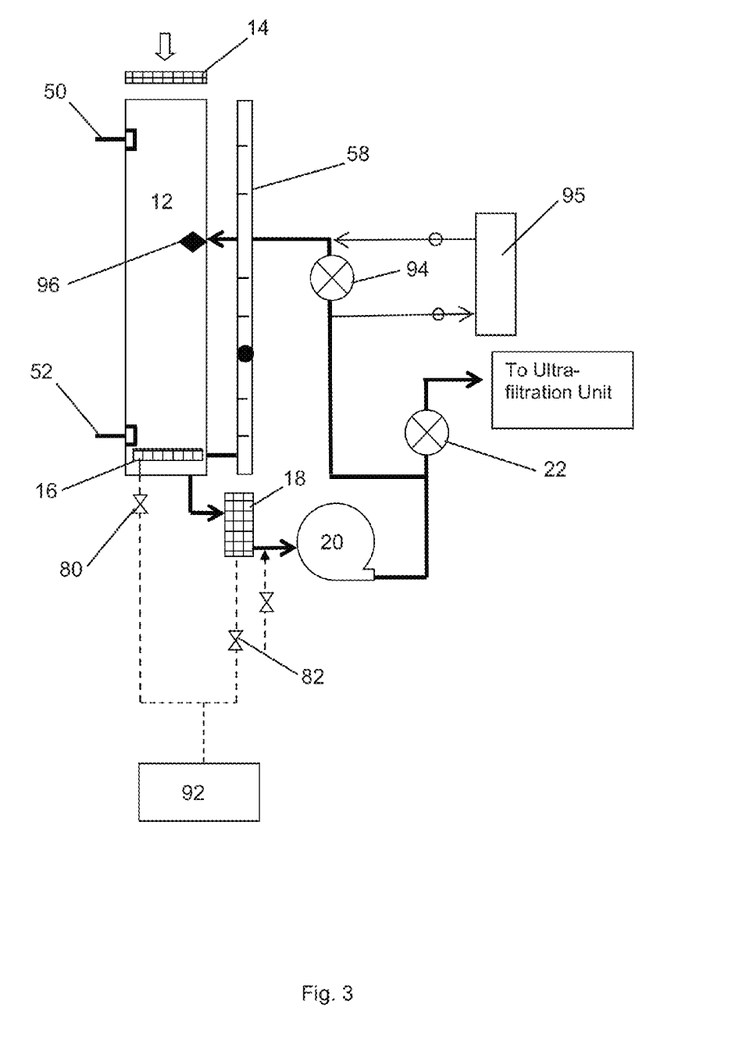
FIG. 3 is a flow diagram illustrating a treatment tank circulation system according to an embodiment of the present invention.

FIG. 3 illustrates a portion of a flow diagram according to an embodiment of the present invention. In this embodiment, the various components work in the manner as previously described, however, mixing valve 94 is preferably provided and when open, preferably provides fluid communication between pump 20 and tank mixing inlet 96. In this embodiment, pre-treatment chemicals and raw water can be poured, pumped, and/or injected into tank 12. Valve 22 can then be closed, valve 94 opened, and pump 20 activated such that the contents of tank 12 are circulated and thus stirred and mixed. Although virtually any configuration of inlet 96 can provide desirable results due to the turbulence imparted thereby to the contents of tank 12, in a preferred embodiment, inlet 96 preferably provides a jetted-action to increase turbulence. Optionally, inlet 96 can include one or more rotating nozzles to increase the stirring effect. In an alternative embodiment, in addition to providing mixing valve 94 and inlet 96, or in lieu thereof, one or more mechanized stirring components can be provided, including but not limited to one or more rotating and/or translating members. Optionally, valve 94 can be closed and small valves leading to and from chemical cartridge 95 can be opened such that when pump 20 is activated, water from tank 12 flows through cartridge 95, picking up one or more chemicals contained therein before being injected back into tank 12. Accordingly, in this recirculation loop, one or more pre-treatment chemicals can be disposed in cartridge 95. In one embodiment, pre-treatment chemicals can optionally be automatically and/or manually injected into tank 12. In one embodiment, tank 12 can be at least partially filled with raw water, after which a user can activate a pre-programmed function such that the raw water in tank 12 is automatically mixed with one or more pre-treatment chemicals, before flowing through the various processing steps in accordance with the other teachings of the present invention. Optionally, one or more sensors can be disposed in fluid communication with tank 12 such that the water quality of the raw water contained therein can be determined and/or monitored. In this embodiment, one or more aspects of the water quality can be displayed and/or communicated through user-interface 118 (see FIG. 5). Optionally, pre-treatment procedures, including the automatic injection of one or more pre-treatment chemicals into tank 12 can be initiated and/or controlled at least partially based on the water quality as observed by the one or more sensors. In this embodiment, the user can optionally select the desired pre-treatment chemical from a selectable list which is presented on a user-interface. Alternatively, the user can input into the system one or more characteristics of the raw water such that control system 117 can automatically determine and/or suggest which chemicals should be added to pre-treat the water in tank 12.

An embodiment of the present invention preferably comprises a method, apparatus, and system for turning dirty water into potable water. In one embodiment, the method preferably comprises the following steps: the raw dirty water preferably enters raw water storage tank 12 manually via bucket, pump or other method, through removable inlet screen 14 which removes large debris. The dirty water can optionally be treated chemically with coagulants or others pre-treatment chemicals prior to entering or within raw water storage tank 12. Raw water storage tank 12 can serve as a chemical reaction tank, flocculation tank, and/or settling tank. As sediment accumulates in raw water storage tank 12, it can be released through raw water tank under-drain 16 by opening valve 80 and flushing them through outlet 92. The water level of raw water storage tank 12 is preferably indicated by level gage 58, which is preferably a float gage and/or sight glass. The settled water preferably continues through tubing or piping to removable pump screen 18, preferably a finer screen than removable inlet screen 14. Optionally, pump screen 18 can be cleaned by flushing valve 82. The settled water is pumped by raw water feed pump 20. The various process valves preferably operate in sequence, as described in the flow chart of FIG. 2, thus filtering the water through ultrafiltration unit 24. Disinfection can be accomplished by flow through disinfection system 30 to integral treated water storage tank 32, and optional chlorination/chemical disinfection in integral treated water storage tank 32, which provides chemical contact time. The filtration cycle can operate in batch mode (i.e., the entire contents of tank 12 can be processed in one operation). Optionally, however, the filtration cycle can occur continuously such that raw water can continue to be added to raw water tank 12 while the earlier-added water is being processed. The membrane filtration rate (flux-rate) can be selected to run at variable flow rates, depending on the raw water quality. This can be accomplished by operating the feed pump 20 at variable flow rates. When water is processed in batch mode, the ability to accurately and adequately pre-treat the contents of tank 12 can be enhanced. After filtration is complete, backwash of ultrafiltration unit 24 occurs by treated water pump 34 and pressure tank 36 providing treated water to ultrafiltration unit 24 for back-flushing and cleaning. After the backwash cycle is complete, treated water pump 34 and pressure tank 36 provide treated water to drinking water faucet 46 for distribution and drinking through cartridge filters 40, 42 and 44, which serve to provide additional treatment or conditioning of the treated water by using alternative media for specific treatment needs. A storable and removable platform is contained in the unit to place bottles, preferably 5-gallon style bottles, or containers for filling, and can be removed to accommodate taller or different containers. Treated water storage tank 32 water level is preferably provided by level gauge 60. Level gauges 58 and 60 are preferably clear plastic tubes with an internal float to indicate the water level, and are graduated on the outside to indicate volume in various units. High level water switches 50 and 54 and low level water switches 52 and 56 are preferably water level switches that control pump 20 and 34 functions. Alternative frame and siding materials can also be used, various membranes and filters can also be used, alternate controls can also be used, and others as typical to the industry.

Figure 4:
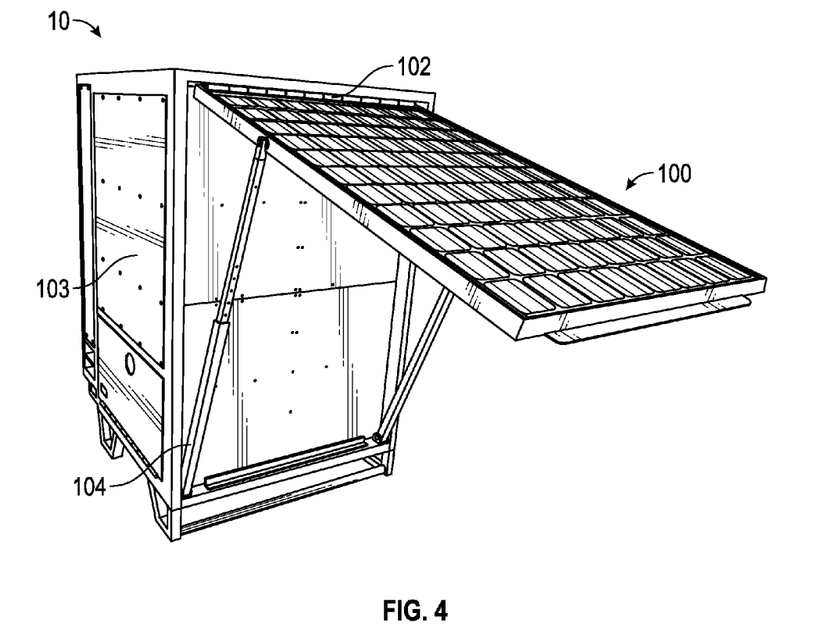
FIG. 4 illustrates a solar panel attached to an embodiment of the present invention.

As best illustrated in FIG. 4, in one embodiment, water treatment unit 10 preferably includes one or more solar panels 100. Solar panels 100 most preferably hinge about one or more hinges 102 such that they can be positioned at a predetermined orientation so as to provide a maximum amount of exposure to available sunlight in any given location where unit 10 is disposed. Solar panel 100 can optionally be deployed by removing retaining pins in supports 104, and adjusting the angle of panel 100 to suit the location and season, and provide optimum solar power. Solar panel 100 preferably closes in the stored position, flush with frame 114 (see FIG. 6) for protection and hauling. Filtration unit 10 can preferably be transported by small truck or cart, by positioning it horizontally and sliding on the skids 110 (see FIG. 5) onto the bed of the truck or other vehicle. In an alternative embodiment of the present invention, the water treatment apparatus comprises connections for auxiliary solar panels. In addition, the water treatment apparatus can comprise a separate battery compartment having batteries that supply electrical energy storage for night and/or cloudy operations. There is also preferably an external power plug port for a generator, an additional battery and/or an additional solar panel.

Figure 5:
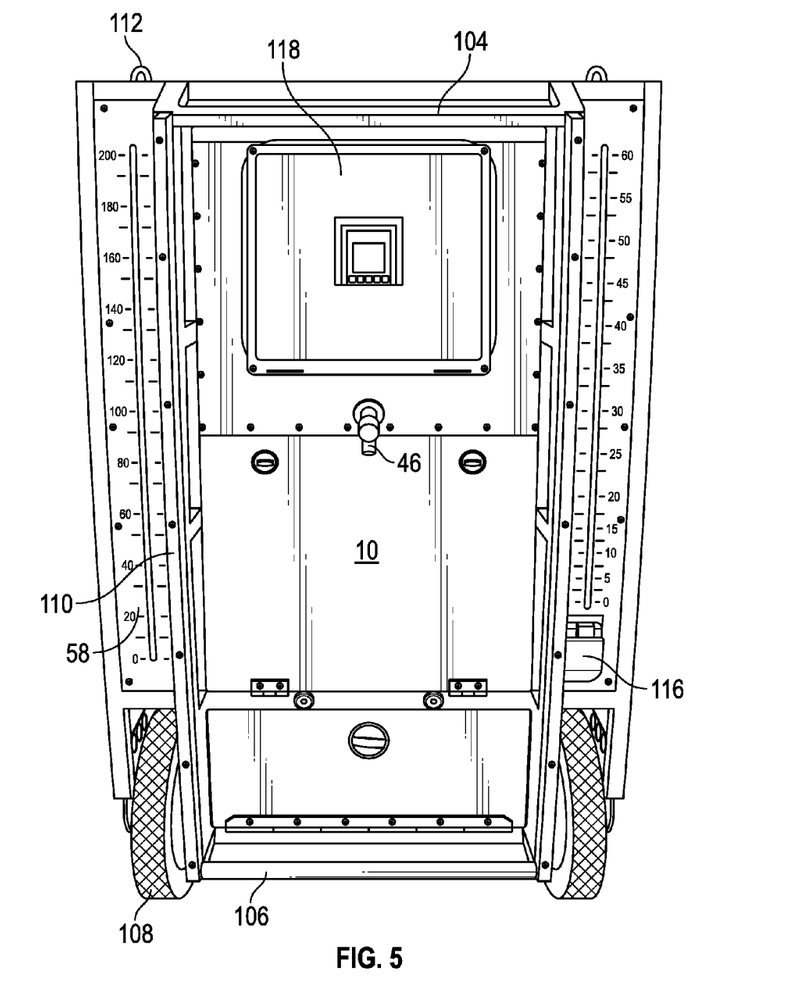
FIGS. 5-8 are perspective views of a water filtration unit according to embodiments of the present invention.

Referring now to FIG. 5, in one embodiment, treatment unit 10 preferably includes lift handles 104 and 106, wheels 108, skids 110, and/or lift hooks 112. With these components, unit 10 can be picked up horizontally into a small pickup truck, such as are typically found in third-world countries, onto flatbed trailer, or onto any other device for transporting the apparatus. Skids 110 can be replaceable and preferably includes a low friction plastic material to enhance sliding. Grab handles 104 and 106 assist in maneuvering unit 10. Foot pads are also preferably provided which provide a solid footing for filtration unit 10. Handles 106 and/or 104 and/or pickup eyes 112 are preferably positioned to allow a strap to go around frame 114 (see FIG. 6) of treatment unit 10. Frame 114 is preferably constructed such that the weight of treatment unit 10 is distributed thereby when treatment unit 10 is both sitting on the ground and when it is suspended by lift hooks 112. Auxiliary power input 116 is also preferably provided such that filtration unit 10 can be powered from an external power source.

Figure 6:
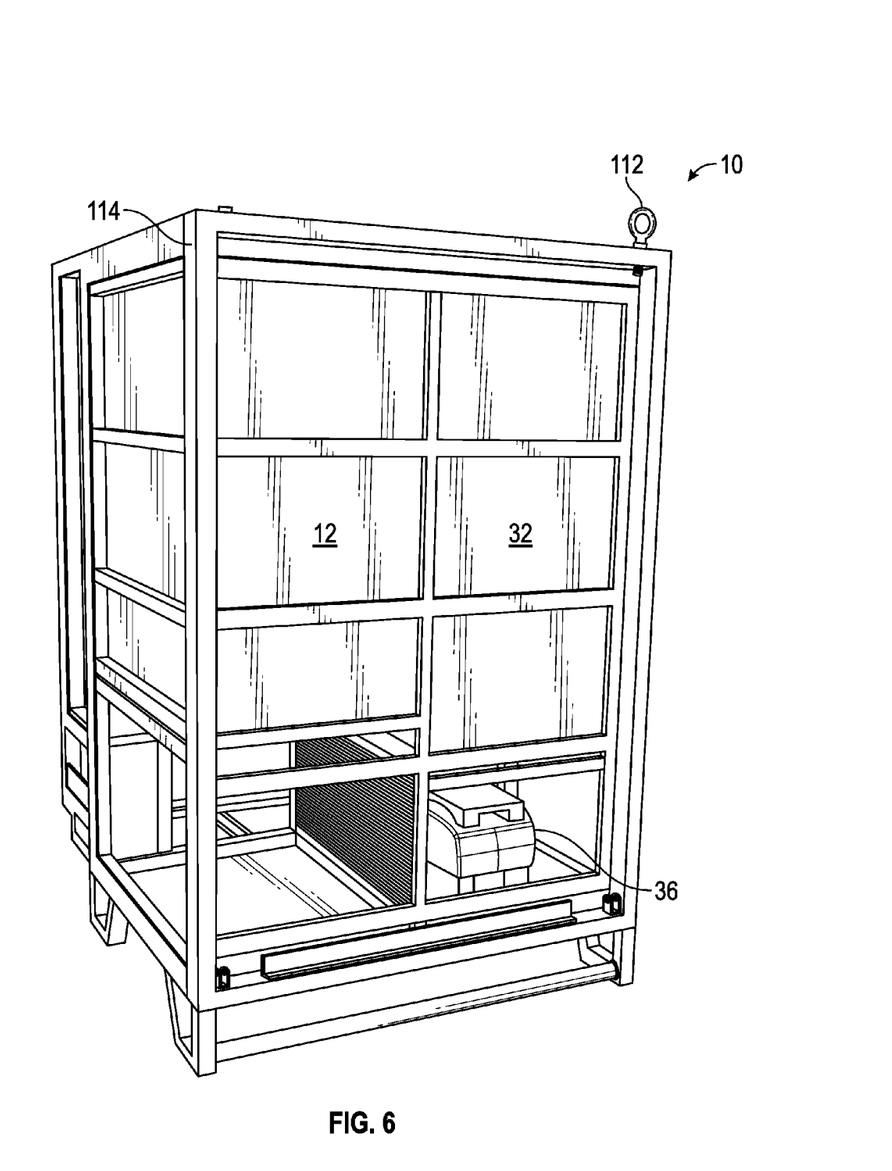

Referring now to FIG. 6, frame 114 is preferably made of a light and rigid material, most preferably aluminum. Alternate frame materials can include, but are not limited to plastic, carbon fiber, stainless steel, fiberglass, combinations thereof and the like. Optionally, side panels 103 (see FIG. 4) can be attached to frame 114. In this embodiment, side panels 103 optionally help secure the components of filtration unit 10 from dust, debris, and/or theft, and are preferably formed from plastic, metal, fiberglass or some other durable and/or corrosion resistant material.

In one embodiment, filtration unit 10 can be transported via helicopter using lift eyes 112, which allow a lifting strap to fully wrap around the bottom and sides of the frame, providing additional support. Wheels 108, which can include casters, are preferably non-pneumatic and/or otherwise remain "flat free" and/or flat resistant. A double axel is preferably provided with isolated wheel wells so an individual wheel can be changed out without affecting the other wheels. Filtration unit 10 can be locally maneuvered, most preferably by pushing on lower grab handle 106 by foot while pulling upper grab handles 104 and tilting unit 10 onto wheels 108, in a "dolly" or "hand-truck" like manner. When unit 10 is stationary, its weight preferably rests on feet and/or skids, while wheels 108 are suspended above ground, thus providing stability and relieving pressure from the hard "no-flat" wheels.

Figure 7:
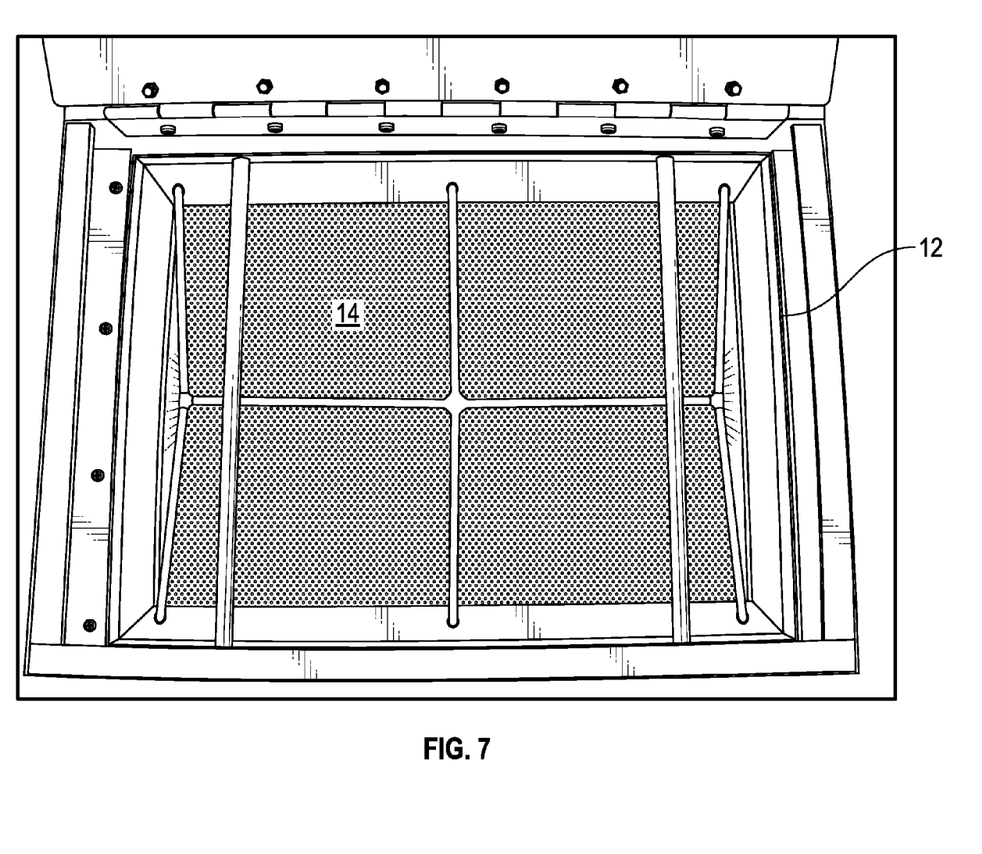
Figure 8:
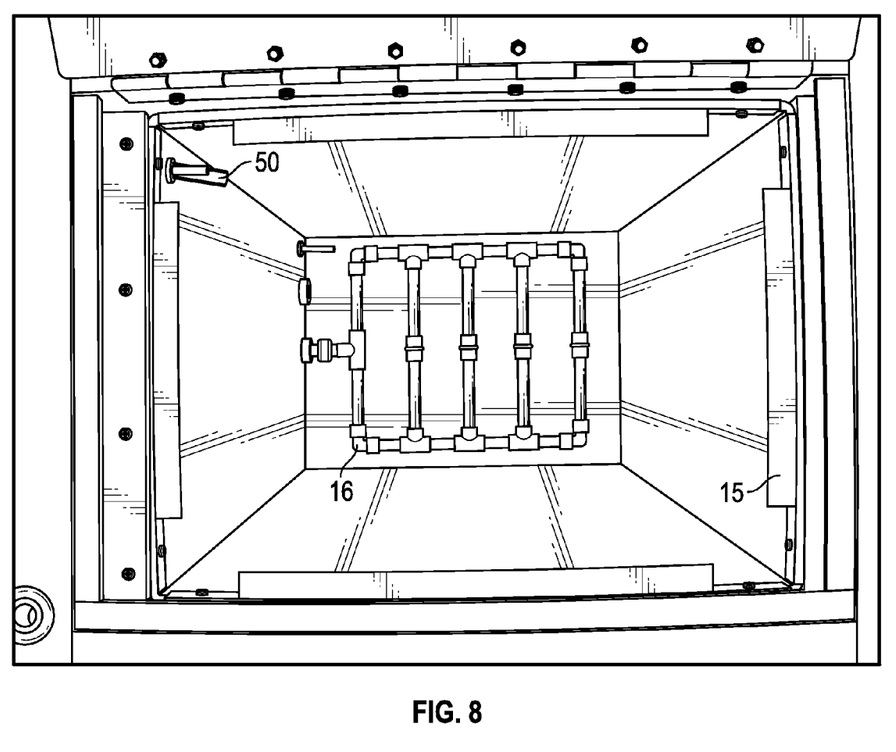

FIGS. 7 and 8 respectively illustrate top views of tank 12 wherein inlet screen 14 is disposed and removed. In FIG. 8, holding mechanism 15, which holds inlet screen 14 in place is visible, as well as high water level sensor 50, and under-drain 16. In one embodiment, under-drain 16 can include an inlet, which can optionally comprise a plurality of spaced-apart openings, which can optionally be formed from a grid of connected piping that is perforated on an underside and suspended a short distance above the bottom of tank 12, such that sediments which settle out of the raw water in tank 12 can fall to the bottom of the tank and be removed by under-drain 16. Optionally, under-drain 16 can be connected to a drain line and blow down valve 80, such that the blow down valve 80 can be opened manually and the settled solids and sediment flushed out of tank 12. Optionally pump screen 18 is in fluid communication with tank 12 in any configuration capable of providing a fluid communication path such that water can travel from tank 12 into pump screen 18 if provided. Accordingly, water can flow into screen 18 from a floating skimmer inlet configuration.

Figure 9:
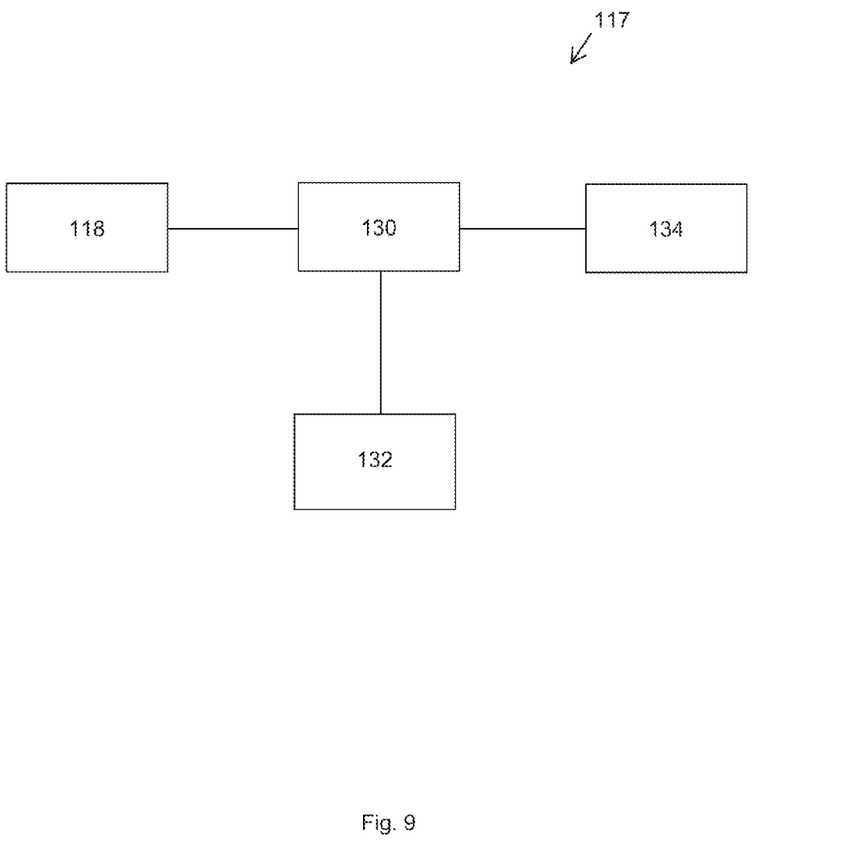
FIG. 9 is a diagram illustrating a control system according to an embodiment of the present invention.

As best illustrated in FIG. 9, control system 117 preferably includes user interface 118 such that process-flow tasks can be controlled, managed, and/or changed. Control system 117 also preferably includes microcontroller 130, which can also be a microprocessor, programmable logic controller, combinations thereof, and the like, as well as power supply 132. For simplicity, in this figure the various pumps and valves of the embodiments of the present invention are illustrated as components 134. Control system 117 thus preferably provides not only the ability for input and output communications with a user, but also provides the ability to systematically activate, manipulate, and/or deactivate the various valves and pumps. In one embodiment, user interface 118 can include a touchscreen. Optionally user interface 118, can provide the ability to communicate in multiple languages and/or dialects, including but not limited to graphically-based communications. In one embodiment, filtration unit 10 can include one or more lights. Optionally, a sun-shade can be provided, which shades interface 118, thus allowing optimum viewing in bright sunlight. Optionally, control system 117 can provide the ability to control and/or program lighting for night-time operation. In another embodiment of the present invention, control system 117 can include various communications capabilities, which can include but is not limited to satellite telephone, Global Positioning Satellite (GPS) locating, video conferencing, text messaging, and communications via the Internet.

Optionally, doors and hatches to various components can be provided and are optionally lockable. Frame flooring is preferably constructed from perforated plate material or otherwise allows for drainage for leaks and spills.

In one embodiment, ultrafiltration unit 24 can include a membrane filtration system which can be: capable of being cleaned by back-washing (thereby avoiding frequent, costly filter replacements); capable of back washing using a dedicated back wash pump; capable of being chemically back-washed; capable of being cleaned using an air-scouring process during back-washing; capable of utilizing a membrane drain-down cycle during back washing; capable of being chemically cleaned in place (avoiding membrane removal and transportation to an off-site location for chemical cleaning); capable of performing a manual membrane fiber integrity test; and/or capable of utilizing various membrane filter types, including but not limited to micro-filtration, ultra-filtration, nano-filtration, hyper-filtration, reverse osmosis, and these membranes constructed from various materials, including but not limited to polymeric materials (such as PVDF, PES), ceramics, and the like.

In one embodiment, tanks 12 and/or 32 can have a capacity of from about 5 gallons to about 250 gallons, more preferably from about 20 gallons to about 100 gallons, and most preferably from about 30 gallons to about 75 gallons.

An embodiment of the present invention can provide water treatment which complies with the requirements of the United States Environmental Protection Agency's Long Term 2 Surface Water Treatment Rule in producing potable water for human consumption. An embodiment of the present invention preferably suspends the processing of raw and/or treated water during a backwashing operation Although the invention has been described in detail with particular reference to these preferred embodiments, other embodiments can achieve the same results. Variations and modifications of the present invention will be obvious to those skilled in the art and it is intended to cover in the appended claims all such modifications and equivalents.

What is claimed is:

1. A water-treatment system comprising:
   a raw water tank, wherein the raw water tank is fillable through an opening at an upper portion thereof and the raw water tank comprises a mechanism having a recirculation loop powered by a pump for providing turbulence during pre-treatment of water contained in the raw water tank;
   the recirculation loop includes one or more rotating nozzles through which raw water and at least one pre-treatment chemical are injected back into the raw water tank;
   an ultra-filtration unit;
   a treated water tank;
   the raw water tank, the ultra-filtration unit, and the treated water tank secured within a transportable frame; and
   a control unit.

2. The system of claim 1 wherein said transportable frame comprises a wheeled frame having a size which is movable by a single person tilting it onto its wheels and pushing it under human power.

3. The system of claim 1 further comprising a disinfection unit.

4. The system of claim 3 wherein said disinfection unit comprises an ultraviolet light source.

5. The system of claim 1 further comprising a treated water recirculation loop.

6. The system of claim 1 further comprising a backwash system.

7. The system of claim 6 wherein said backwash system comprises a backwash filter.

8. The system of claim 7 wherein said backwash filter comprises a cleaning chemical that is backwashed into said ultrafiltration unit.

9. The system of claim 1 wherein said control unit comprises an electronic control system.

10. The system of claim 9 wherein said control system comprises a plurality of electrically-activated valves.

11. The system of claim 10 wherein said control system further comprises a solar-panel.

\* \* \* \* \*